United States Patent
Delp et al.

(10) Patent No.: US 11,940,798 B2
(45) Date of Patent: Mar. 26, 2024

(54) SYSTEM, METHOD, AND COMPUTER-READABLE MEDIUM FOR AN AUTONOMOUS VEHICLE TO PASS A BICYCLE

(71) Applicant: TOYOTA RESEARCH INSTITUTE, INC., Los Altos, CA (US)

(72) Inventors: Michael J. Delp, Ann Arbor, MI (US); Ruijia Feng, Ann Arbor, MI (US); Shan Bao, Ann Arbor, MI (US)

(73) Assignees: TOYOTA RESEARCH INSTITUTE, INC., Los Altos, CA (US); The Regents of the University of Michigan, Ann Arbor, MI (US)

( * ) Notice: Subject to any disclaimer, the term of this patent is extended or adjusted under 35 U.S.C. 154(b) by 7 days.

(21) Appl. No.: 16/029,270

(22) Filed: Jul. 6, 2018

(65) Prior Publication Data
US 2020/0012286 A1    Jan. 9, 2020

(51) Int. Cl.
*G05D 1/02*    (2020.01)
*G01C 21/34*    (2006.01)
(Continued)

(52) U.S. Cl.
CPC ....... *G05D 1/0214* (2013.01); *G01C 21/3461* (2013.01); *G01C 21/3626* (2013.01);
(Continued)

(58) Field of Classification Search
CPC .. G05D 1/0214; G05D 1/0088; G05D 1/0257; G05D 1/0289; G05D 1/0231;
(Continued)

(56) References Cited

U.S. PATENT DOCUMENTS 8,195,394 B1 *   6/2012   Zhu ................. G01C 21/26
                                                   701/514
9,014,905 B1 *   4/2015   Kretzschmar .......... G05D 1/021
                                                   701/28
(Continued)

FOREIGN PATENT DOCUMENTS

CN           103942359 A      7/2014

OTHER PUBLICATIONS

Mohammed Elhenawy, et al., "Advanced Operations Focused on Connected Vehicles/Infrastructure (CVI-UTC)", Bicycle Naturalistic Data Collection, Jun. 15, 2016, 40 pages.
(Continued)

*Primary Examiner* — James M McPherson
*Assistant Examiner* — Bakari Underwood
(74) *Attorney, Agent, or Firm* — Oblon, McClelland, Maier & Neustadt, L.L.P.

(57) ABSTRACT

An autonomous vehicle configured to autonomously pass a cyclist includes an imaging device and processing circuitry configured to receive information from the imaging device. Additionally, the processing circuitry of the autonomous vehicle is configured to identify a cyclist passing situation based on the information received from the imaging device, and plan a path of an autonomous vehicle based on the cyclist passing situation. The autonomous vehicle also includes a positioning system and the processing circuitry is further configured to receive information from the positioning system, determine if the cyclist passing situation is sufficiently identified, and identify the cyclist passing situation based on the information from the imaging device and the positioning system when the cyclist passing situation is not sufficiently identified based on the information received from the imaging device.

9 Claims, 16 Drawing Sheets

(51) Int. Cl.
  G01C 21/36 (2006.01)
  G05D 1/00 (2006.01)
  G06V 20/56 (2022.01)
  G06V 20/58 (2022.01)
  G08G 1/16 (2006.01)
(52) U.S. Cl.
  CPC ........... G05D 1/0231 (2013.01); G06V 20/58 (2022.01); G06V 20/588 (2022.01); G08G 1/166 (2013.01); *G05D 2201/0213* (2013.01)
(58) Field of Classification Search
  CPC ...... G05D 1/02; G05D 1/0212; G01S 17/936; G01S 13/931; G01S 2013/9375; G08G 1/167; G08G 1/04; G08G 1/096827; G08G 9/02; B60W 2550/10; B60W 2550/402; B60W 30/0956; B60W 30/06; B60W 30/09; B60W 30/18163; B60W 40/10; B60W 50/00; B60W 50/082; B60W 2420/52; B60W 2420/06; B60W 2420/30; B60Q 5/006; B60Q 9/008; G06K 9/00791; G06K 9/00805; G06K 9/00798; B62D 15/0265; B62D 15/029; B60L 53/36
  See application file for complete search history.

(56) References Cited

U.S. PATENT DOCUMENTS

| | | | |
|---|---|---|---|
| 9,495,874 B1 | | 11/2016 | Zhu et al. |
| 9,607,513 B1 | * | 3/2017 | Williams ......... B60W 30/18145 |
| 2017/0144657 A1 | * | 5/2017 | Hassani ............ B60W 30/0953 |
| 2017/0259753 A1 | * | 9/2017 | Meyhofer ................. B60R 1/06 |
| 2017/0268896 A1 | | 9/2017 | Bai et al. |
| 2018/0039273 A1 | * | 2/2018 | Delp ........................ B60R 11/00 |
| 2018/0136643 A1 | * | 5/2018 | Tao ....................... G05D 1/0022 |
| 2018/0267558 A1 | * | 9/2018 | Tiwari ................. G05D 1/0246 |
| 2018/0314247 A1 | * | 11/2018 | Sun ...................... G06F 16/2455 |
| 2019/0012574 A1 | * | 1/2019 | Anthony ............... G06K 9/6254 |
| 2019/0113916 A1 | * | 4/2019 | Guo ....................... B60W 50/02 |
| 2019/0137290 A1 | * | 5/2019 | Levy .................. G01C 21/3461 |
| 2019/0235499 A1 | * | 8/2019 | Kazemi ............ B60W 30/0956 |
| 2019/0278275 A1 | * | 9/2019 | Song ....................... G08G 1/165 |

OTHER PUBLICATIONS

Marco Dozza, et al., "How do drivers overtake cyclists?", Accident Analysis and Prevention, vol. 88, 2016, pp. 29-36.

Fred Feng, et al., "Drivers Overtaking Bicyclists—An Examination Using Naturalistic Driving Data", Accident Analysis & Prevention, vol. 15, Jun. 2018, pp. 98-109.

Fred Feng, et al., "Vehicle Lane Encroachment When Drivers Overtaking Bicyclists—An Examination Using Naturalistic Driving Data", Transportation Research Board (TRB), Automated Vehicles Symposium, 2018, 15 pages.

\* cited by examiner

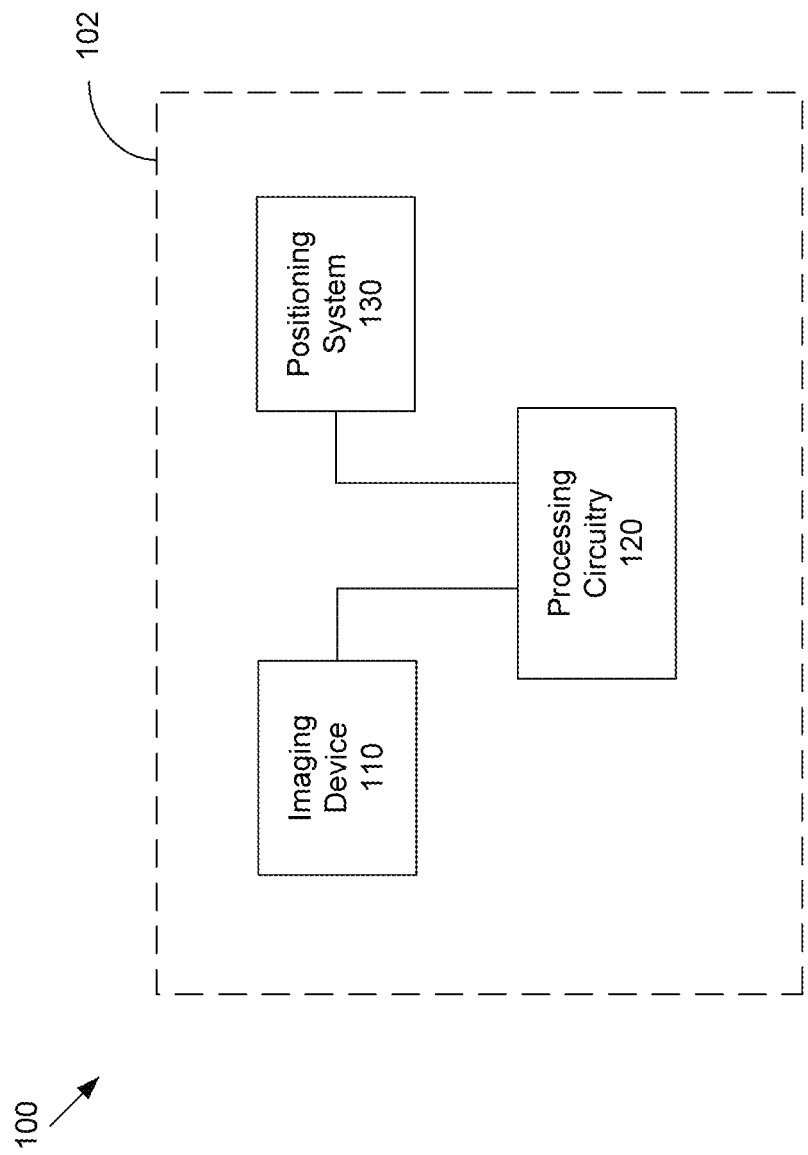

| Metric | Left side lane marking type | Bike lane | Left-side | # of events | mean | SD | p_0 | |
|---|---|---|---|---|---|---|---|---|
| Encroachment to left-side lane (m) | Solid centerline | No | Yes | 247 | 0.17 | 0.45 | -0.91 | |
| Encroachment to left-side lane (m) | Solid centerline | No | No | 556 | 0.67 | 0.5 | -0.88 | |
| Encroachment to left-side lane (m) | Solid centerline | Yes | Yes | 579 | -0.22 | 0.36 | -1.5 | |
| Encroachment to left-side lane (m) | Solid centerline | Yes | No | 473 | 0.07 | 0.43 | -0.91 | |
| Encroachment to left-side lane (m) | Dashed line | No | Yes | 69 | 0.37 | 0.83 | -0.75 | |
| Encroachment to left-side lane (m) | Dashed line | No | No | 94 | 0.94 | 0.95 | -1.23 | |
| Encroachment to left-side lane (m) | Dashed line | Yes | Yes | 159 | -0.38 | 0.35 | -1.31 | |
| Encroachment to left-side lane (m) | Dashed line | Yes | No | 128 | -0.13 | 0.56 | -1.03 | |
| Encroachment to left-side lane (m) | Center left-turn lane line | No | Yes | 52 | 0.89 | 0.56 | -0.24 | |
| Encroachment to left-side lane (m) | Center left-turn lane line | Yes | Yes | 203 | -0.06 | 0.38 | -1.12 | |
| Vehicle speed at overtaking (mph) | Solid centerline | No | Yes | 247 | 29.3 | 7.9 | 9.9 | |
| Vehicle speed at overtaking (mph) | Solid centerline | No | No | 556 | 30.9 | 8 | 11.7 | |
| Vehicle speed at overtaking (mph) | Solid centerline | Yes | Yes | 579 | 30.5 | 6.4 | 13.2 | |
| Vehicle speed at overtaking (mph) | Solid centerline | Yes | No | 473 | 32 | 6.8 | 15.4 | |
| Vehicle speed at overtaking (mph) | Dashed line | No | Yes | 69 | 31.8 | 6.3 | 16.1 | |
| Vehicle speed at overtaking (mph) | Dashed line | No | No | 94 | 32 | 7.3 | 12.1 | |
| Vehicle speed at overtaking (mph) | Dashed line | Yes | Yes | 159 | 31 | 7.2 | 14.9 | |
| Vehicle speed at overtaking (mph) | Dashed line | Yes | No | 128 | 33.1 | 8.8 | 11.9 | |
| Vehicle speed at overtaking (mph) | Center left-turn lane line | No | Yes | 52 | 33.3 | 5.3 | 22.1 | |
| Vehicle speed at overtaking (mph) | Center left-turn lane line | Yes | No | 203 | 32.8 | 5.2 | 14.3 | |
| Distance to bike lane marking (m) | Solid centerline | Yes | Yes | 550 | 1.190788 | 0.33 | 0.32 | |
| Distance to bike lane marking (m) | Solid centerline | Yes | No | 442 | 1.439321 | 0.4 | 0.37 | |
| Distance to bike lane marking (m) | Dashed line | Yes | Yes | 185 | 0.999915 | 0.37 | 0.1 | |
| Distance to bike lane marking (m) | Dashed line | Yes | No | 143 | 1.299518 | 0.56 | 0.29 | |
| Distance to bike lane marking (m) | Center left-turn lane line | Yes | Yes | 248 | 1.440851 | 0.36 | 0.51 | |

| Metric | Left side lane marking type | Bike lane | Left-side | # of events | mean | SD | P_0 |
|---|---|---|---|---|---|---|---|
| Minimum vehicle speed within 5s prior to overtaking (mph) | Solid centerline | No | Yes | 247 | 25.8 | 8.9 | 7.8 |
| Minimum vehicle speed within 5s prior to overtaking (mph) | Solid centerline | No | No | 556 | 27.1 | 9.0 | 4.3 |
| Minimum vehicle speed within 5s prior to overtaking (mph) | Solid centerline | Yes | Yes | 579 | 27.8 | 7.7 | 7.4 |
| Minimum vehicle speed within 5s prior to overtaking (mph) | Solid centerline | Yes | No | 473 | 28.9 | 8 | 8 |
| Minimum vehicle speed within 5s prior to overtaking (mph) | Dashed line | No | Yes | 69 | 27.8 | 7.7 | 8.9 |
| Minimum vehicle speed within 5s prior to overtaking (mph) | Dashed line | No | No | 94 | 28.2 | 8.2 | 9.4 |
| Minimum vehicle speed within 5s prior to overtaking (mph) | Dashed line | Yes | Yes | 159 | 28.2 | 8.2 | 9.1 |
| Minimum vehicle speed within 5s prior to overtaking (mph) | Dashed line | Yes | No | 128 | 30.8 | 9.5 | 11.6 |
| Minimum vehicle speed within 5s prior to overtaking (mph) | Center left-turn lane line | No | Yes | 52 | 28.9 | 7 | 13.1 |
| Minimum vehicle speed within 5s prior to overtaking (mph) | Center left-turn lane line | Yes | No | 203 | 29.5 | 7.1 | 11.5 |
| Difference btw minimal speed and overtaking speed (mph) | Solid centerline | No | Yes | 247 | 3.5 | 3.9 | 0 |
| Difference btw minimal speed and overtaking speed (mph) | Solid centerline | No | No | 556 | 3.8 | 4.2 | 0 |
| Difference btw minimal speed and overtaking speed (mph) | Solid centerline | Yes | Yes | 579 | 2.7 | 3.4 | 0 |
| Difference btw minimal speed and overtaking speed (mph) | Solid centerline | Yes | No | 473 | 3.1 | 3.9 | 0 |
| Difference btw minimal speed and overtaking speed (mph) | Dashed line | No | Yes | 69 | 4 | 4.1 | 0 |
| Difference btw minimal speed and overtaking speed (mph) | Dashed line | No | No | 94 | 3.8 | 3.5 | 0 |
| Difference btw minimal speed and overtaking speed (mph) | Dashed line | Yes | Yes | 159 | 2.8 | 3.2 | 0 |
| Difference btw minimal speed and overtaking speed (mph) | Dashed line | Yes | No | 128 | 2.2 | 3 | 0 |
| Difference btw minimal speed and overtaking speed (mph) | Center left-turn lane line | No | Yes | 52 | 3.5 | 4.2 | 0 |
| Difference btw minimal speed and overtaking speed (mph) | Center left-turn lane line | Yes | No | 203 | 3.3 | 4.3 | 0 |

| Metric | Left side lane marking type | Bike lane Left-side | Left-side | # of events | mean | SD | P_0 |
|---|---|---|---|---|---|---|---|
| Maximum vehicle speed within 5s prior to overtaking (mph) | Solid centerline | No | Yes | 247 | 30.5 | 8 | 17 |
| Maximum vehicle speed within 5s prior to overtaking (mph) | Solid centerline | No | No | 556 | 31.9 | 8.2 | 14 |
| Maximum vehicle speed within 5s prior to overtaking (mph) | Solid centerline | Yes | Yes | 579 | 31.5 | 6.5 | 14.8 |
| Maximum vehicle speed within 5s prior to overtaking (mph) | Solid centerline | Yes | No | 473 | 32.9 | 6.7 | 18 |
| Maximum vehicle speed within 5s prior to overtaking (mph) | Dashed line | No | Yes | 69 | 33.2 | 6.1 | 19.6 |
| Maximum vehicle speed within 5s prior to overtaking (mph) | Dashed line | No | No | 94 | 33.2 | 6.7 | 15.7 |
| Maximum vehicle speed within 5s prior to overtaking (mph) | Dashed line | Yes | Yes | 159 | 32.4 | 7.3 | 15.5 |
| Maximum vehicle speed within 5s prior to overtaking (mph) | Dashed line | Yes | No | 128 | 34.7 | 8.6 | 17.4 |
| Maximum vehicle speed within 5s prior to overtaking (mph) | Center left-turn lane line | No | Yes | 52 | 34 | 5.4 | 22.1 |
| Maximum vehicle speed within 5s prior to overtaking (mph) | Center left-turn lane line | Yes | No | 203 | 33.8 | 5 | 17.2 |
| Difference btw maximum speed and overtaking speed (mph) | Solid centerline | No | Yes | 247 | -1.2 | 1.9 | -13.2 |
| Difference btw maximum speed and overtaking speed (mph) | Solid centerline | No | No | 556 | -1 | 1.8 | -14.2 |
| Difference btw maximum speed and overtaking speed (mph) | Solid centerline | Yes | Yes | 579 | -1 | 1.8 | -12.6 |
| Difference btw maximum speed and overtaking speed (mph) | Solid centerline | Yes | No | 473 | -0.9 | 1.7 | -12.9 |
| Difference btw maximum speed and overtaking speed (mph) | Dashed line | No | Yes | 69 | -1.4 | 2.7 | -12.8 |
| Difference btw maximum speed and overtaking speed (mph) | Dashed line | No | No | 94 | -1.2 | 2.3 | -12.1 |
| Difference btw maximum speed and overtaking speed (mph) | Dashed line | Yes | Yes | 159 | -1.4 | 2.2 | -10.7 |
| Difference btw maximum speed and overtaking speed (mph) | Dashed line | Yes | No | 128 | -1.7 | 3.1 | -24 |
| Difference btw maximum speed and overtaking speed (mph) | Center left-turn lane line | No | Yes | 52 | -0.7 | 1.4 | -6.7 |
| Difference btw maximum speed and overtaking speed (mph) | Center left-turn lane line | Yes | No | 203 | -1 | 1.9 | -12.6 |

Metric: Encroachment

| Comparison | Condition | chi-square | p-value | Significant? | Cohen's d * |
|---|---|---|---|---|---|
| Traffic vs. no traffic | Solid centerline + road edge | 155.5 | <0.001 | Yes | -1.03 |
| Traffic vs. no traffic | Solid centerline + bike lane | 118.4 | <0.001 | Yes | -0.74 |
| Traffic vs. no traffic | Dashed line + road edge | 16.6 | <0.001 | Yes | -0.62 |
| Traffic vs. no traffic | Dashed line + bike lane | 16 | <0.001 | Yes | -0.56 |
| Road edge vs. bike lane | Solid centerline + traffic | 125.7 | <0.001 | Yes | 1.01 |
| Road edge vs. bike lane | Solid centerline + no traffic | 320.8 | <0.001 | Yes | 1.29 |
| Road edge vs. bike lane | Dashed line + traffic | 58.3 | <0.001 | Yes | 1.37 |
| Road edge vs. bike lane | Dashed line + no traffic | 70.3 | <0.001 | Yes | 1.41 |
| Solid centerline vs. dashed line | Road edge + traffic | 0.3 | 0.61 | No | -0.36 |
| Solid centerline vs. dashed line | Road edge + no traffic | 8.9 | <0.01 | Yes | -0.45 |
| Solid centerline vs. dashed line | Bike lane + traffic | 25.4 | <0.001 | Yes | 0.46 |
| Solid centerline vs. dashed line | Bike lane + no traffic | 29.4 | <0.001 | Yes | 0.42 |
| Center left-turn vs. solid centerline | Road edge + no traffic | 6.4 | <0.05 | Yes | 0.44 |
| Center left-turn vs. solid centerline | Bike lane + no traffic | 14 | <0.001 | Yes | -0.32 |
| Center left-turn vs. dashed line | Road edge + no traffic | 0.2 | 0.63 | No | -0.05 |
| Center left-turn vs. dashed line | Bike lane + no traffic | 7.1 | <0.01 | Yes | 0.13 |

*Fig. 6A*

| Speed-related metrics | | Metric 1: Vehicle speed at overtaking | | | | Metric 2: Minimum vehicle speed within 5s prior to overtaking | | | |
|---|---|---|---|---|---|---|---|---|---|
| Comparison | Condition | chi-square | p-value | Significant? | Cohen's d | chi-square | p-value | Significant? | Cohen's d |
| Traffic vs. no traffic | Solid centerline + road edge | 6.8738 | 0.0087 | Yes | -0.2 | 2.7018 | 0.1002 | No | -0.13 |
| Traffic vs. no traffic | Solid centerline + bike lane | 16.1343 | <0.001 | Yes | -0.24 | 5.189 | 0.0227 | Yes | -0.14 |
| Traffic vs. no traffic | dashed line + road edge | 0.4558 | 0.4996 | No | -0.03 | 0.229 | 0.6346 | No | -0.05 |
| Traffic vs. no traffic | Dashed line + bike lane | 4.3223 | 0.0376 | Yes | -0.26 | 5.8128 | 0.0159 | Yes | -0.3 |
| Road edge vs. bike lane | Solid centerline + traffic | 5.52 | 0.0188 | Yes | -0.18 | 11.1341 | <0.001 | Yes | -0.24 |
| Road edge vs. bike lane | Solid centerline + no traffic | 7.1284 | 0.0076 | Yes | -0.15 | 12.8634 | <0.001 | Yes | -0.3 |
| Road edge vs. bike lane | Dashed line + traffic | 1.1535 | 0.2832 | No | 0.12 | 0 | 0.989 | No | -0.04 |
| Road edge vs. bike lane | Dashed line + no traffic | 0.3358 | 0.5622 | No | -0.13 | 3.5945 | 0.058 | No | -0.3 |
| Solid centerline vs. dashed line | Road edge + traffic | 9.1802 | 0.0024 | Yes | -0.32 | 3.9913 | 0.0457 | Yes | -0.23 |
| Solid centerline vs. dashed line | Road edge + no traffic | 5.0902 | 0.0241 | Yes | -0.14 | 2.3484 | 0.1261 | No | -0.11 |
| Solid centerline vs. dashed line | Bike lane + traffic | 1.16 | 0.2815 | No | -0.08 | 0.0537 | 0.8167 | No | -0.09 |
| Solid centerline vs. dashed line | Bike lane + no traffic | 2.1083 | 0.1465 | No | -0.13 | 4.6621 | 0.0308 | Yes | -0.24 |
| Center left-turn vs. solid centerline | Road edge + no traffic | 7.6691 | 0.0056 | Yes | 0.31 | 6.8833 | 0.0087 | Yes | 0.29 |
| Center left-turn vs. solid centerline | Bike lane + no traffic | 6.9832 | 0.0082 | Yes | 0.33 | 3.3328 | 0.0679 | No | 0.09 |
| Center left-turn vs. dashed line | Road edge + no traffic | 0.3708 | 0.5428 | No | 0.2 | 1.2768 | 0.2583 | No | 0.22 |
| Center left-turn vs. dashed line | Bike lane + no traffic | 0.0301 | 0.8624 | No | -0.04 | 1.0895 | 0.2966 | No | -0.16 |

*Fig. 6B*

| Metric 3: Maximum vehicle speed within 5s prior to overtaking | | | | Metric 4: Difference btw minimum speed and overtaking speed | | | | Metric 5: Difference btw maximum speed and overtaking speed | | | |
|---|---|---|---|---|---|---|---|---|---|---|---|
| chi-square | p-value | Significant? | Cohen's d | chi-square | p-value | Significant? | Cohen's d | chi-square | p-value | Significant? | Cohen's d |
| 5.2398 | 0.0221 | Yes | -0.17 | 0.3156 | 0.5743 | No | -0.08 | 0.5489 | 0.4588 | No | -0.1 |
| 13.2212 | <0.001 | Yes | -0.22 | 2.9358 | 0.0866 | No | -0.14 | 0.7263 | 0.3941 | No | -0.07 |
| 0.0506 | 0.822 | No | 0 | 0.0354 | 0.8507 | No | 0.04 | 0.0089 | 0.9249 | No | -0.09 |
| 6.1557 | 0.0131 | Yes | -0.3 | 3.16 | 0.0755 | No | 0.19 | 0.5841 | 0.4447 | No | 0.1 |
| 4.9659 | 0.0259 | Yes | -0.14 | 7.2668 | 0.007 | Yes | 0.23 | 0.014 | 0.9058 | No | -0.08 |
| 6.6995 | 0.0096 | Yes | -0.13 | 4.6993 | 0.0302 | Yes | 0.18 | 0.0059 | 0.9388 | No | -0.04 |
| 1.0574 | 0.3038 | No | 0.12 | 4.0859 | 0.0432 | Yes | 0.33 | 1.2061 | 0.2721 | No | 0 |
| 1.5887 | 0.2075 | No | -0.2 | 15.4467 | <0.001 | Yes | 0.5 | 3.9238 | 0.0476 | Yes | 0.18 |
| 11.3749 | <0.001 | Yes | -0.35 | 0.9212 | 0.3372 | No | -0.12 | 0.1005 | 0.7512 | No | 0.12 |
| 5.2864 | 0.0215 | Yes | -0.16 | 1.1065 | 0.2928 | No | 0 | 0.005 | 0.8434 | No | 0.1 |
| 3.0782 | 0.0793 | No | -0.13 | 0.2528 | 0.6165 | No | -0.05 | 2.0747 | 0.1498 | No | 0.2 |
| 6.4133 | 0.0113 | Yes | -0.26 | 7.362 | 0.0067 | Yes | 0.25 | 8.4255 | 0.0037 | Yes | 0.37 |
| 6.7134 | 0.0096 | Yes | 0.27 | 0.331 | 0.565 | No | -0.09 | 0.3614 | 0.5477 | No | 0.14 |
| 7.6442 | 0.0057 | Yes | 0.15 | 0.3961 | 0.5291 | No | 0.09 | 0.4914 | 0.4833 | No | -0.06 |
| 0.1293 | 0.7191 | No | 0.14 | 1.2987 | 0.2545 | No | -0.1 | 0.1952 | 0.6586 | No | 0.22 |
| 1.3924 | 0.238 | No | -0.14 | 3.5411 | 0.0599 | No | 0.27 | 4.1163 | 0.0425 | Yes | 0.27 |

*Fig. 6C*

Metric: Distance from vehicle right edge to bike lane/shoulder marking

| Comparison | Condition | chi-square | p-value | Significant? | Cohen's d |
|---|---|---|---|---|---|
| Traffic vs. no traffic | Solid centerline | 104.4 | <0.001 | Yes | -0.77 |
| Traffic vs. no traffic | Dashed line | 28 | <0.001 | Yes | -0.6 |
| Solid centerline vs. dashed line | Traffic | 41.7 | <0.001 | Yes | 0.48 |
| Solid centerline vs. dashed line | No traffic | 20.5 | <0.001 | Yes | 0.38 |
| Center left-turn vs. solid centerline | No traffic | 0.02 | 0.9 | No | -0.34 |
| Center left-turn vs. dashed line | No traffic | 19.4 | <0.001 | Yes | 0.08 |

*Fig. 6D*

SYSTEM, METHOD, AND COMPUTER-READABLE MEDIUM FOR AN AUTONOMOUS VEHICLE TO PASS A BICYCLE

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Bicycling has long been an important mode of transportation for its economic, environmental, and health benefits. In recent years there has been a growing trend of bicycling in the United States. However, bicyclists are vulnerable road users who get little protection in an event of a crash that involves motor vehicles. The safety issues of riding a bicycle on roadways with mixed traffic have been a growing concern. Among all types of crashes involving bicyclists, a motorist approaching a bicyclist from behind is particularly dangerous and much more likely to result in serious injuries and fatalities. Much progress has been made in developing the autonomous vehicle technologies. However, one critical challenge is that the autonomous vehicles need to share the existing infrastructure with other non-motorized road users such as bicyclists. Given the complexity of the real-world road environment and the variability and less predictability of the non-motorized road users, a solution for autonomous vehicles interacting with cyclists safely and efficiently is needed.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

According to aspects of the disclosed subject matter, an autonomous vehicle configured to autonomously pass a cyclist includes an imaging device and processing circuitry configured to receive information from the imaging device. Additionally, the processing circuitry of the autonomous vehicle is configured to identify a cyclist passing situation based on the information received from the imaging device, and plan a path of an autonomous vehicle based on the cyclist passing situation. The autonomous vehicle also includes a positioning system and the processing circuitry is further configured to receive information from the positioning system, determine if the cyclist passing situation is sufficiently identified, and identify the cyclist passing situation based on the information from the imaging device and the positioning system when the cyclist passing situation is not sufficiently identified based on the information received from the imaging device.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 depicts an exemplary block diagram of an autonomous vehicle system for passing a cyclist according to one or more aspects of the disclosed subject matter;

FIG. 5A illustrates a table of various overtaking metrics according to one or more aspects of the disclosed subject matter;

FIG. 5B illustrates a table of various overtaking metrics according to one or more aspects of the disclosed subject matter;

FIG. 5C illustrates a table of various overtaking metrics according to one or more aspects of the disclosed subject matter;

FIG. 5D illustrates a table of various overtaking metrics according to one or more aspects of the disclosed subject matter;

FIG. 5E illustrates a table of various overtaking metrics according to one or more aspects of the disclosed subject matter;

FIG. 5F illustrates a table of various overtaking metrics according to one or more aspects of the disclosed subject matter;

FIG. 6A illustrates at table of a significance test according to one or more aspects of the disclosed subject matter;

FIG. 6B illustrates a table of various significance tests according to one or more aspects of the disclosed subject matter;

FIG. 6C illustrates a table of various significance tests according to one or more aspects of the disclosed subject matter; and FIG. 6D illustrates a table of a significance test according to one or more aspects of the disclosed subject matter.

DETAILED DESCRIPTION

Figure 2A:
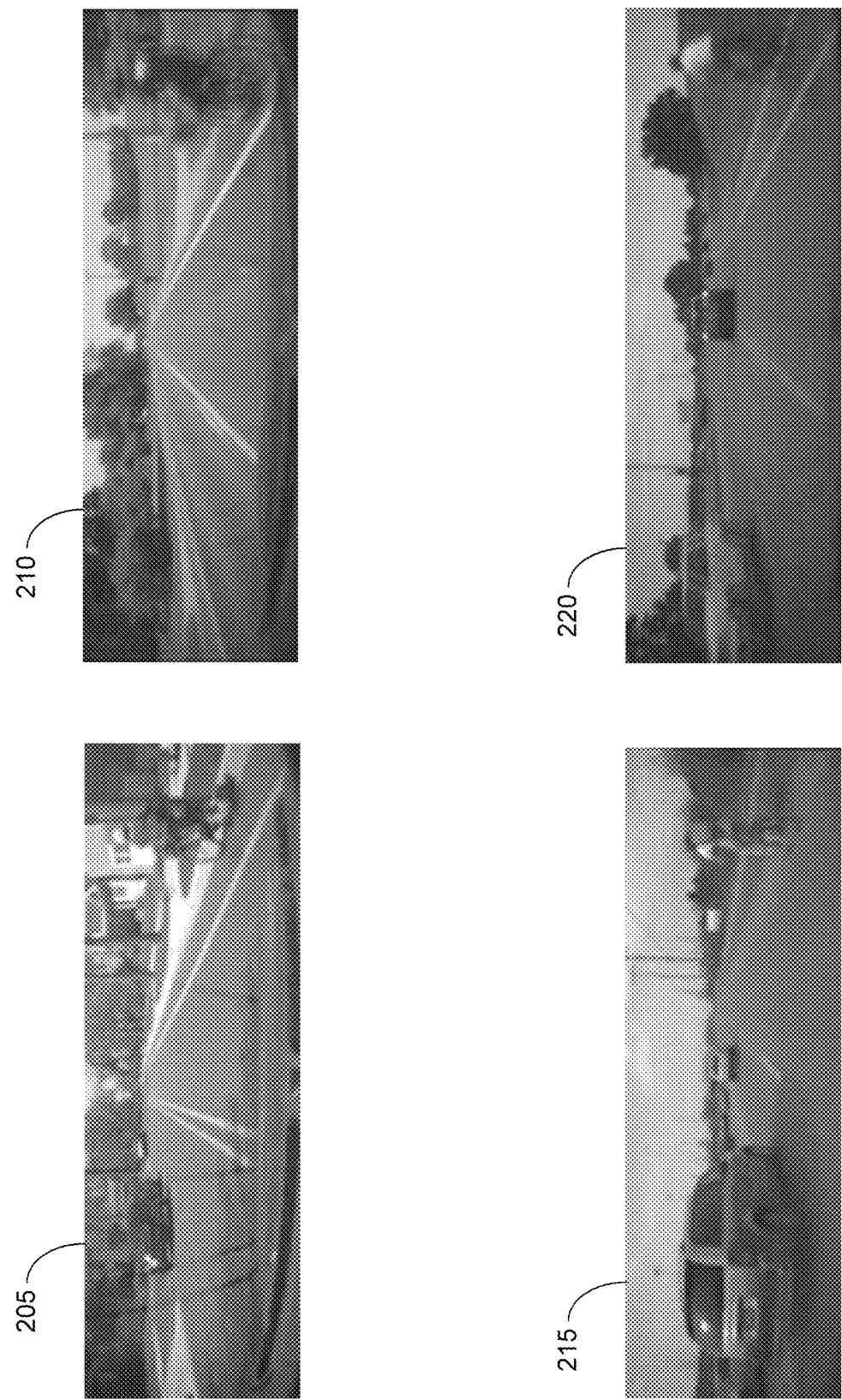
FIG. 2A illustrates exemplary cyclist passing situations according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "front," "rear," "side," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views.

FIG. 1 depicts an exemplary block diagram of an autonomous vehicle system (herein referred to as system 100) for passing a cyclist according to one or more aspects of the disclosed subject matter. As will be discussed in more detail later, one or more methods according to various embodiments of the disclosed subject matter can be implemented using the system 100 or portions thereof. Put another way, system 100, or portions thereof, can perform the functions or operations described herein regarding the various methods or portions thereof (including those implemented using a non-transitory computer-readable medium storing a program that, when executed, configures or causes a computer to perform or cause performance of the described method(s) or portions thereof).

System 100 can include an imaging device 110, processing circuitry 120 (which can include internal and/or external memory), and a positioning system 130 (e.g., global positioning system (GPS)). In an embodiment, the imaging device 110, the processing circuitry 120, and the positioning system 130 can be implemented in a stand-alone apparatus 102. The stand-alone apparatus 102 can be an autonomous vehicle or a highly automated vehicle, for example. For convenience and clarity in the description, the stand-alone apparatus 102 may be referred to herein as autonomous vehicle 102.

Generally speaking, the system 100 can identify various situations that may arise when a vehicle is passing a cyclist and implement a passing maneuver based on the identified passing situation. In other words, the system 100 can plan a path to pass the cyclist based on variables identified relating to the passing maneuver. For example, the passing situations identified by the system 100 can include identifying variables to a right side of the autonomous vehicle 102 (e.g., a cyclist in a bike lane, a cyclist on a shoulder of the road, and a cyclist with no bike lane or road shoulder). Additionally, the passing situations identified by the system 110 can include identifying variables to a left side of the autonomous vehicles (e.g., identifying solid or dashed centerlines, oncoming traffic, and the like as further described herein.

More specifically, as the autonomous vehicle 102 approaches a cyclist in front of the autonomous vehicle 102, the imaging device 110 can detect information about the following variables. With respect a right side of the autonomous vehicle 102, the imaging device 110 can identify (e.g., locally and/or via the processing circuitry 120) whether a bike lane exists, whether a road shoulder exists, or whether the bicyclist is riding near grass and/or a hard curb. With respect to a left side of the autonomous vehicle 102, the imaging device 110 can identify if the autonomous vehicle 102 is adjacent to the centerline and whether the centerline(s) are solid or dashed. Additionally, with respect to the left side of the autonomous vehicle, the imaging device 110 can identify whether the lane adjacent to the lane the autonomous vehicle 102 is traveling in is a lane for oncoming traffic, a lane for traffic flowing in the same direction as the autonomous vehicle, or is a turn lane. Additionally, the imaging device 110 can identify whether a lane to the right of the lane the autonomous vehicle 102 is traveling in includes traffic (either oncoming or same-direction traffic) or is a turn lane. Further, the imaging device 110 can determine a width of the lane the autonomous vehicle 102 travelling in, as well as a width of any adjacent lanes.

Based on these variables, when the system 100 encounters a particular situation, the autonomous vehicle 102 can follow a predetermined path plan based on the identified variables. In one embodiment, the path plan can be based on data that mimics the driving behavior of a human that encounters that same situation. For example, the path plan implemented by the autonomous vehicle 102 can maintain a certain distance from the bicycle when passing, it can stay within a particular encroaching distance on adjacent lanes, and/or it can have the autonomous vehicle 102 maintain a particular speed during passing of the bicyclist. In other words, the autonomous vehicle 102 can match the perceived situation (in terms of road structure (bike lane/shoulder compared to curb/grass), oncoming/adjacent traffic compared to no traffic, and the like, and follow a path plan that mimics humans or that uses human behavior as threshold limits for the autonomous vehicle 102 path plan.

Additionally, the positioning system 130 can determine a position of the autonomous vehicle 102. The positioning system 130 can assist the imaging device 110 in identifying the variables for passing a cyclist. For example, when the lines on a road are worn or difficult to identify (e.g., bad weather, nighttime, etc.), the positioning system 130 can determine that the autonomous vehicle 102 is traveling on a two lane road, whether or not the road has a bike lane, and the like. Accordingly, the positioning system 130 can identify and/or assist the imaging device 110 in identifying variables for passing a cyclist so that processing circuitry 120 can generate a path plan based on the received information from one or more of the imaging device 110 and the positioning system 130. Additionally, it should be appreciated that the positioning system 130 can include map references. For example, the map can be stored locally or remotely and accessible by the autonomous vehicle 102. The map can include information for the positioning of the autonomous vehicle 102 including bike lanes, lane types, lane line types, paved shoulder, no shoulder, etc. Additionally, the map can also be updated in real time and/or periodically to include any new bike lanes, traffic updates, road construction, new and/or removed shoulders, etc.

The imaging device 110 can represent one or more imaging devices including one or more cameras, video cameras, Radar, LIDAR, and the like. The imaging device 110 (locally and/or via the processing circuitry) can detect cyclists, identify lane markings, identify other vehicles, determine a width of the lane the vehicle is traveling in, and the like. For example, if the imaging device 110 identifies the variables for a predetermined cyclist passing situation, the processing circuitry 120 can plan a path that the autonomous vehicle 102 will take to pass the cyclist based on the information received from the imaging device 110.

The processing circuitry 120 can carry out instructions to perform or cause performance of various functions, operations, steps or processes of the system 100. The processing circuitry 120 can be configured to store information in memory, operate the system 100, and receive and send information in the form of signal(s) from the imaging device 110 and the positioning system 130.

Figure 2B:
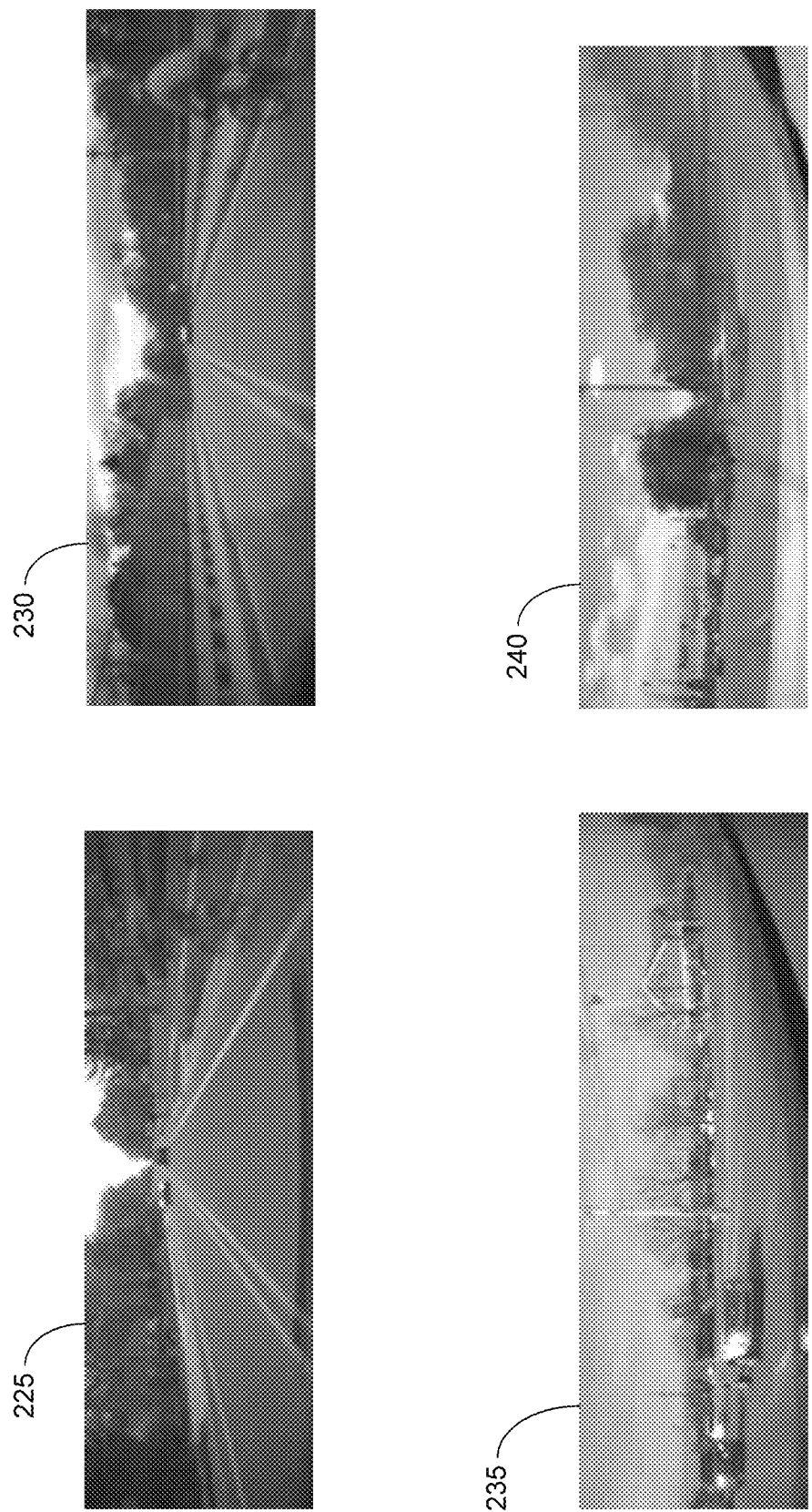
FIG. 2B illustrates exemplary cyclist passing situations according to one or more aspects of the disclosed subject matter.

FIG. 2A and FIG. 2B illustrate exemplary cyclist passing situations according to one or more aspects of the disclosed subject matter. Regarding FIG. 2A, cyclist passing situation 205 illustrates a solid centerline (e.g., double yellow) and a bike lane. Cyclist passing situation 210 illustrates a solid centerline (e.g., no-passing) and a paved shoulder. Cyclist passing situation 215 illustrates a dashed line (non-center) and road edge (e.g., no bike lane or paved shoulder). Cyclist passing situation 220 illustrates a center left-turn lane and bike lane. Regarding FIG. 2B, cyclist passing situation 225 illustrates oncoming traffic with a solid centerline. Cyclist passing situation 230 illustrates no oncoming traffic with a solid centerline. Cyclist passing situation 235 illustrates adjacent traffic with a dashed line (non-center) from rear-left camera view relative to the autonomous vehicle 102. Cyclist passing situation 240 illustrates no adjacent traffic with a dashed line (non-center). In one embodiment, the bike line corresponds to an on-road marked bike line with a solid line and with no physical separation from the traffic lane. The road edge corresponds to a road curb or an unpaved shoulder. Additionally, it should be appreciated that the cyclist passing situations 205-240 are simply exemplary and more cyclist passing situations can arise.

The passing situations 205-240 can indicate various situations that can arise for the autonomous vehicle 102. Based on the passing situations identified via one or more of the imaging system 110 and the positioning system 130, the processing circuitry of the autonomous vehicle 102 can plan a path for passing the cyclist. The cyclist passing situations can assist the autonomous vehicle 102 in safely passing the cyclist, where safely passing the cyclist can include providing a predetermined amount of distance between a right side of the autonomous vehicle 102 and the cyclist while also taking into account any traffic in an adjacent traffic lane (oncoming or adjacent) to a left side of the autonomous vehicle 102. For example, referring to cyclist passing situation 225, the autonomous vehicle 102 can identify (e.g., via the imaging device 110 and the processing circuitry 120) that the cyclist is in a bike lane and the autonomous vehicle 102 can safely pass while still leaving a predetermined amount of space between a right side of the autonomous vehicle 102 and the cyclist. The predetermined amount of space can be based on a safe distance between the autonomous vehicle 102 and the cyclist, which may be based on real world data collected from human drivers passing cyclists, for example.

Now referring to cyclist passing situation 230, the autonomous vehicle 102 can identify (e.g., via the imaging device 110 and the processing circuitry 120) that the cyclist is not in a bike lane and the autonomous vehicle 102 will need to move to the left when passing the cyclist to ensure the predetermined distance between the right side of the autonomous vehicle 102 and the cyclist is maintained while passing. Additionally, again with respect to cyclist passing situation 230, there is no oncoming traffic, which is necessary before executing any passing maneuver. If there were oncoming traffic and no bike lane, the autonomous vehicle path plan would wait until there was no oncoming traffic before executing the passing maneuver. Accordingly, the system 100 can develop the path plan by considering the variables associated with the exemplary cyclist passing situations 205-240. The passing maneuvers based on the path plan can be seen more clearly in FIGS. 3A and 3B.

Any passing maneuver can also be constrained by rules of the road in a particular geographical location. For example, in some states there may be no-passing-zone exceptions that allow drivers to cross the centerline if (1) The slower vehicle is proceeding at less than half the speed of the speed limit applicable to that location. (2) The faster vehicle is capable of overtaking and passing the slower vehicle without exceeding the speed limit. (3) There is sufficient clear sight distance to the left of the center or centerline of the roadway. This information can be incorporated into the path plan when necessary.

Figure 3A:
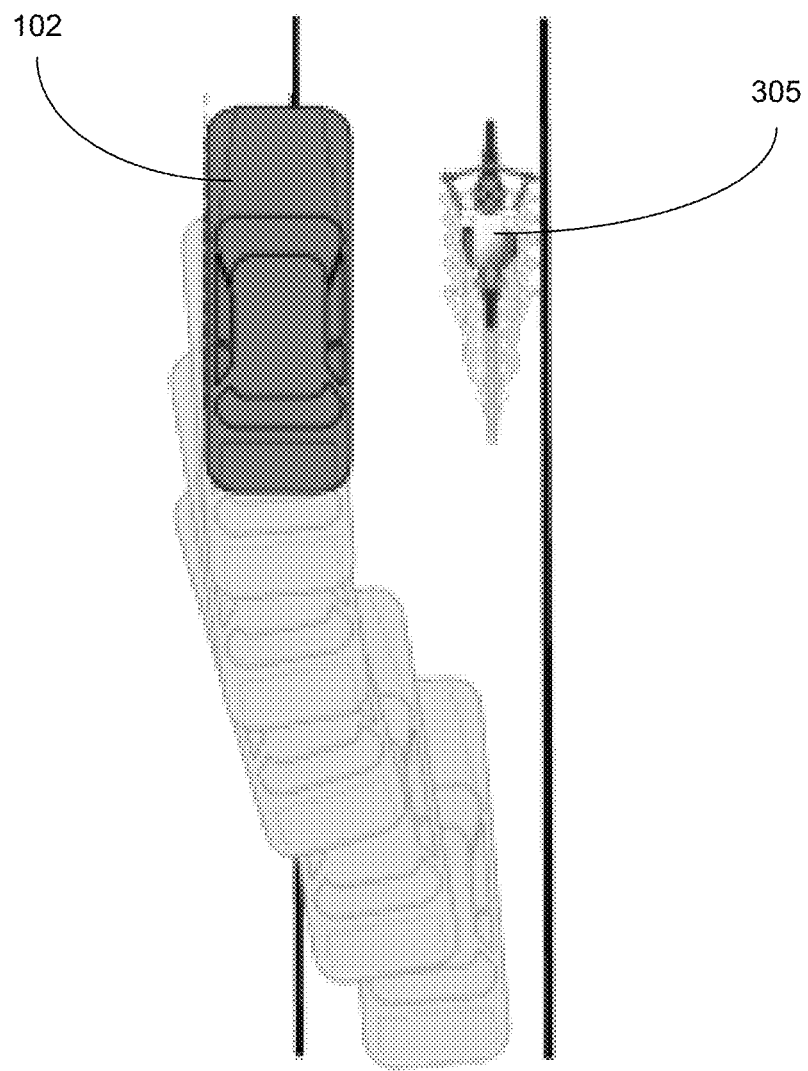
FIG. 3A illustrates a path plan being implemented by an autonomous vehicle according to one or more aspects of the disclosed subject matter.

FIG. 3A illustrates a path plan being implemented by the autonomous vehicle 102 according to one or more aspects of the disclosed subject matter. For example, the autonomous vehicle 102 has identified a cyclist 305 and determined a path plan based on variables corresponding to a cyclist passing situation. Regarding the cyclist passing situation in FIG. 3A, the cyclist 305 does not have a bike lane or paved shoulder, and is riding in the same lane as the autonomous vehicle 102 as a result. In response to identifying this particular cyclist passing situation, the autonomous vehicle 102 can determine that there is no oncoming traffic and execute a passing maneuver based on the path plan to safely and efficiently pass the cyclist 305 while maintaining a minimum predetermined distance between the right side of the autonomous vehicle 102 and the cyclist 305.

Figure 3B:
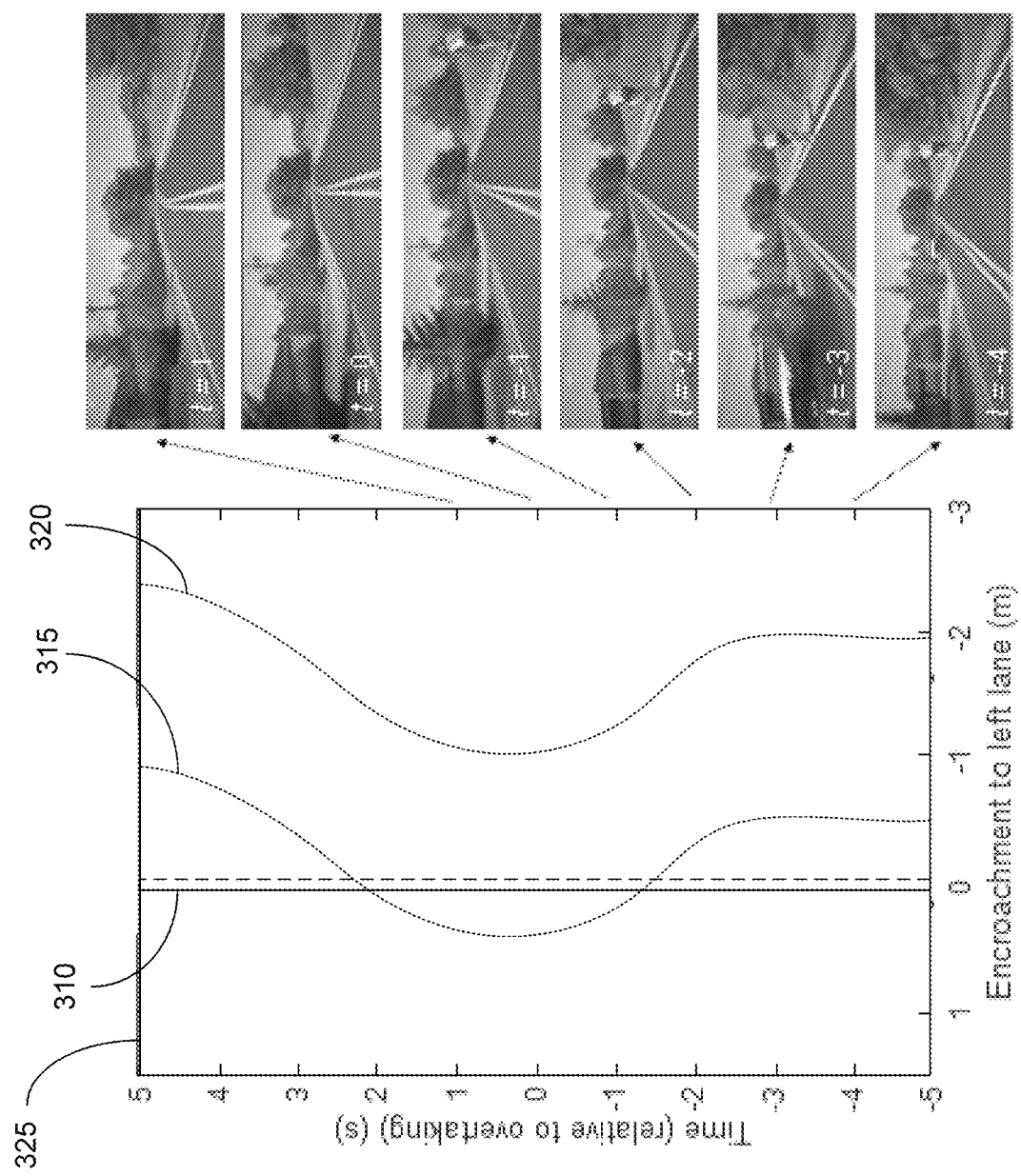
FIG. 3B illustrates a path plan being implemented by an autonomous vehicle according to one or more aspects of the disclosed subject matter.

FIG. 3B illustrates a path plan being implemented by the autonomous vehicle 102 according to one or more aspects of the disclosed subject matter. More specifically, FIG. 3B illustrates a graphical representation of a path plan 325. The graphical representation can include encroachment to an adjacent lane in meters as the x-axis and the y-axis corresponds to time relative to overtaking a cyclist in seconds. Additionally, the path plan 325 is compared to a location of the autonomous vehicle 102 from a time four seconds before overtaking the cyclist (i.e., t=−4) to a time one second after overtaking the cyclist (i.e., t=1). In other words, the path plan 325 can include visual representations (e.g., images from the imaging device 110) corresponding to the implementation of the path plan 325 when the autonomous vehicle 102 is passing a cyclist (e.g., cyclist 305). The path plan 325 shows an adjacent lane marking 310, a left edge 315 of the autonomous vehicle 102, and a right edge 320 of the autonomous vehicle 102. In this cyclist passing situation, the autonomous vehicle 102 can identify (e.g., via the imaging device 110 and/or the positioning system 130) at t=−4 that there is oncoming traffic in the adjacent lane. At t=−2, the autonomous vehicle 102 can safely begin the passing maneuver which will keep a predetermined distance between the right edge 320 of the autonomous vehicle 102 and the cyclist. At t=0, the autonomous vehicle 102 is in line with the cyclist, and once the autonomous vehicle 102 has passed the cyclist, the autonomous vehicle 102 can return fully to the lane in t=1 such the left edge 315 of the autonomous vehicle 102 is no longer encroaching into the adjacent lane.

The graphical representation of the path plan 325 is an example of what can be displayed for the benefit of an operator of the autonomous vehicle 102 (assuming anyone is in the autonomous vehicle 102). This allows the operator to be confident that the autonomous vehicle 102 has identified the cyclist and a corresponding cyclist passing situation, has determined the path plan, and will execute the path plan accordingly.

Figure 4:
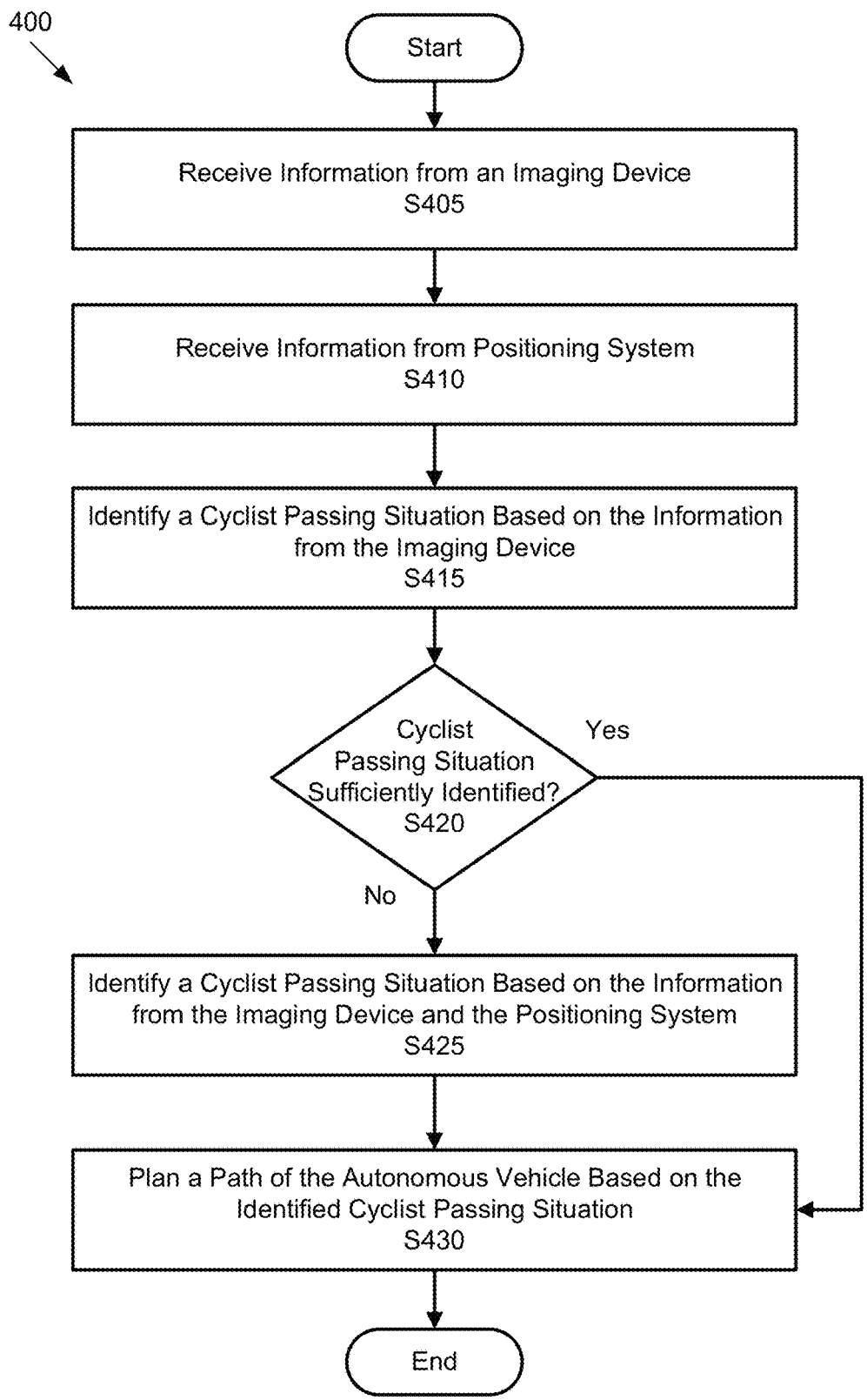
FIG. 4 is an algorithmic flow chart of a method for an autonomous vehicle passing a cyclist according to one or more aspects of the disclosed subject matter.

FIG. 4 is an algorithmic flow chart of a method 400 for an autonomous vehicle passing a cyclist according to one or more aspects of the disclosed subject matter.

In S405, the processing circuitry 120 can receive information from the imaging device 110. The received information from the imaging device 110 can correspond to information about the environment surrounding the autonomous vehicle 102. For example, the information received from the imaging device 110 can include variables corresponding to a cyclist passing situation.

In S410, the processing circuitry 120 can receive information from the positioning system 130. The received information can correspond to information about the environment surrounding the autonomous vehicle 102. For example, the information received from the positioning system 130 can include variables corresponding to a cyclist passing situation (e.g., flow of traffic in a lane adjacent to the lane in which the autonomous vehicle is travelling). Additionally, the information from the positioning system 130 can supplement the information received from the imaging device 110. For example, if the imaging device 110 cannot identify whether the centerline is dashed or solid (e.g., because the centerline is worn), the positioning system 130 can identify the type of road the autonomous vehicle 102 is traveling on. For example, the positioning system 130 can determine that the autonomous vehicle 102 is on a two lane road with traffic traveling two ways which can correspond to a solid centerline (i.e., a no passing zone).

In S415, the processing circuitry 120 can identify a cyclist passing situation based on the information from the imaging device. For example, the processing circuitry 120 can identify one or more of cyclist passing situations 205-240 in FIGS. 2A-2B.

In S420, it can be determined if the cyclist passing situation is sufficiently identified based on the information from the imaging device 110 in S415. The cyclist passing situation is sufficiently determined if the processing circuitry has acquired all the necessary variables to plan a path for the autonomous vehicle 102 to pass the cyclist (e.g., bike path to the right of the autonomous vehicle 102 and the lane markings and any traffic in adjacent lanes to the left of the autonomous vehicle 102). If it is determined that the cyclist passing situation is sufficiently identified, the processing circuitry 120 can plan a path of the autonomous vehicle 102 based on the identified cyclist passing situation in S430. However, if it is determined that the cyclist passing situation is not sufficiently identified, then the processing circuitry 120 can identify a cyclist passing situation based on the information from the imaging device 110 and the positioning system 130 in S425.

In S425, the processing circuitry 120 can identify a cyclist passing situation based on the information from the imaging device 110 and the positioning system 130. For example, if the imaging device 110 cannot identify the type of centerline, the positioning system 130 can provide the additional information needed to determine the cyclist passing situation.

In S430, the processing circuitry 120 can plan a path of the autonomous vehicle based on the identified cyclist passing situation. The path plan can subsequently be implemented such that the autonomous vehicle can execute the maneuver to pass the cyclist safely and efficiently. Additionally, the path plan for the autonomous vehicle 102 can be displayed in the autonomous vehicle 102 for the benefit of the operator of the autonomous vehicle. For example, the operator of the autonomous vehicle may find comfort in knowing that the autonomous vehicle has identified one or more cyclists, has identified a safe and efficient passing maneuver, and is planning the path of the autonomous vehicle accordingly. After the path plan for the autonomous vehicle is planned based on the identified cyclist passing situation, the process can end.

In the above description of FIG. 4, any processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another, or may be combined in various ways. All possible combinations and sub-combinations are intended to fall within the scope of this disclosure.

FIG. 5A illustrates a table of various overtaking metrics according to one or more aspects of the disclosed subject matter.

Figure 5B:
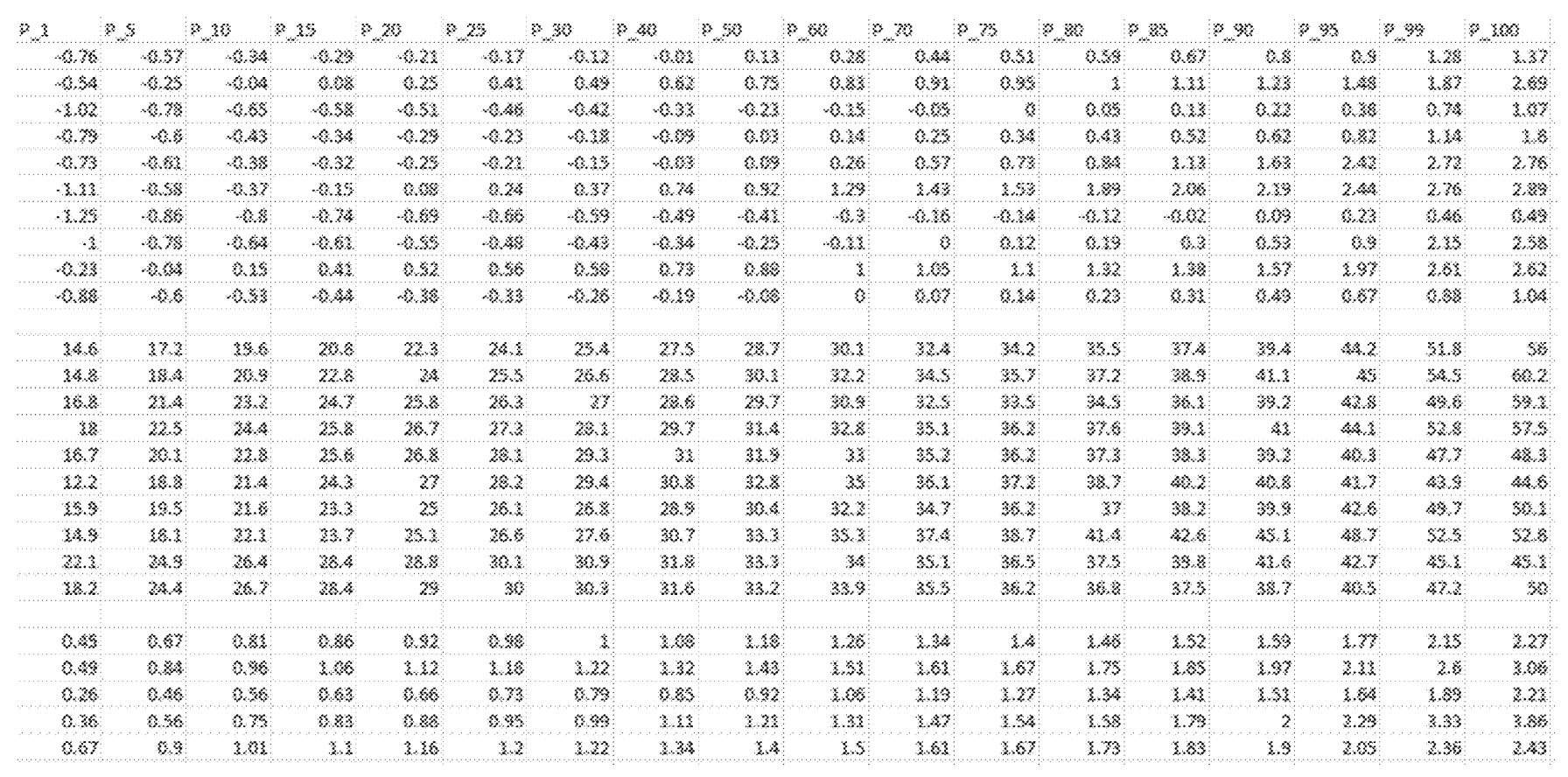

FIG. 5B illustrates a table of various overtaking metrics according to one or more aspects of the disclosed subject matter.

FIG. 5C illustrates a table of various overtaking metrics according to one or more aspects of the disclosed subject matter.

Figure 5D:
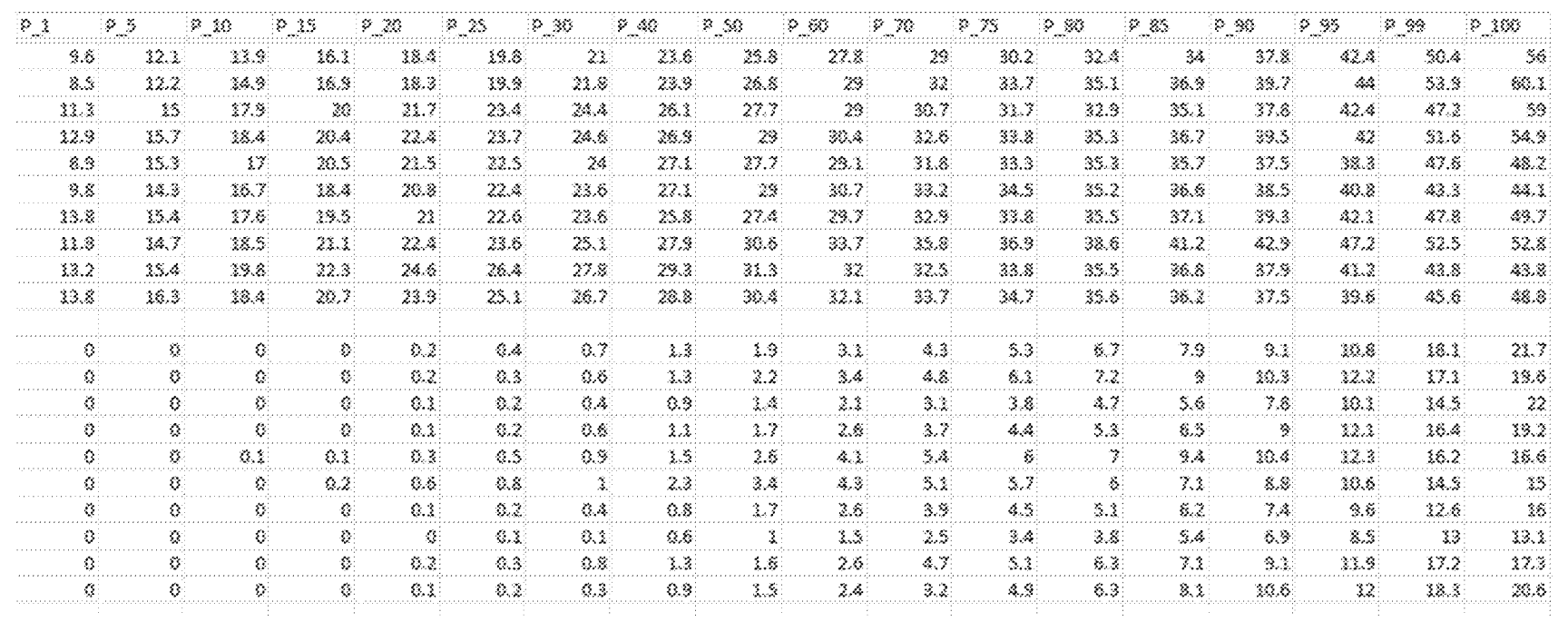

FIG. 5D illustrates a table of various overtaking metrics according to one or more aspects of the disclosed subject matter.

FIG. 5E illustrates a table of various overtaking metrics according to one or more aspects of the disclosed subject matter.

Figure 5F:
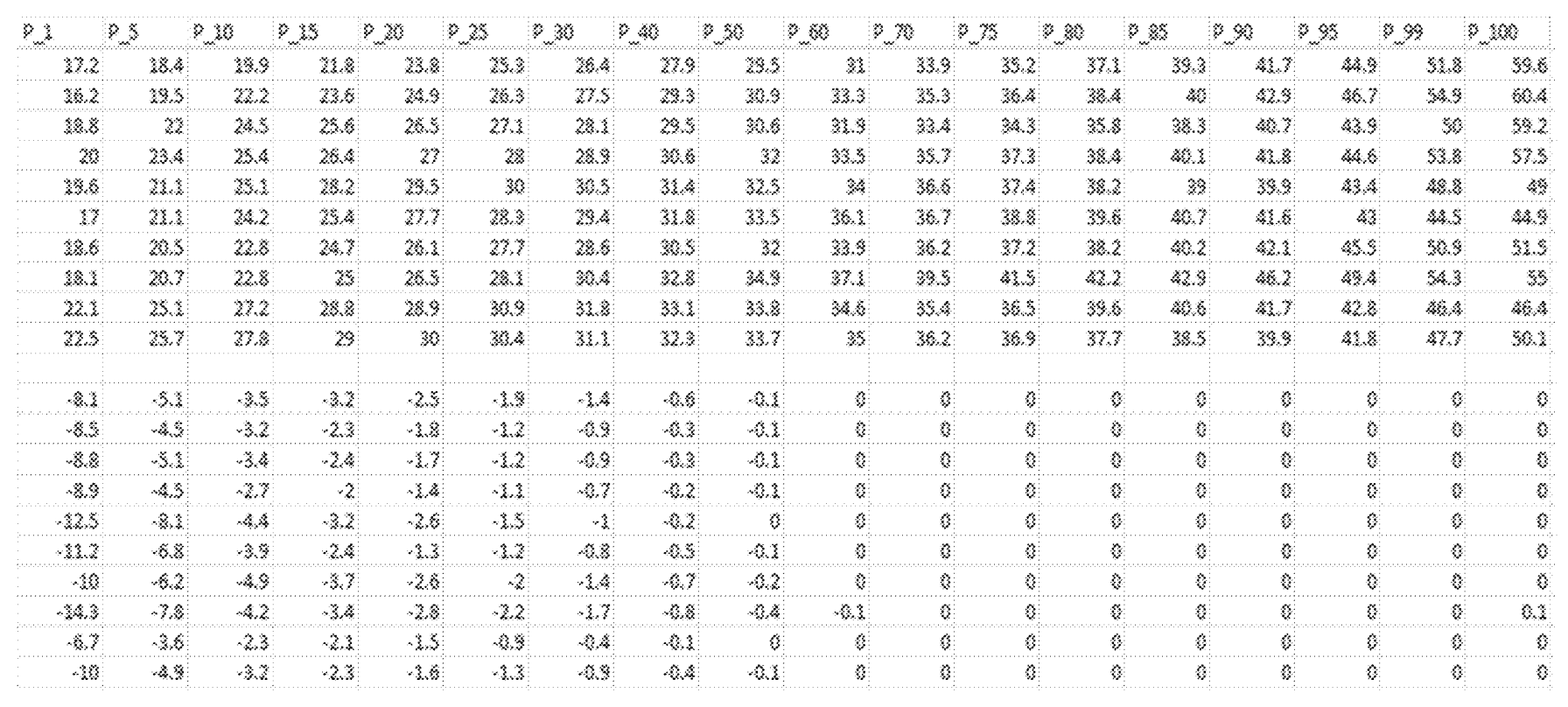

FIG. 5F illustrates a table of various overtaking metrics according to one or more aspects of the disclosed subject matter.

FIG. 6A illustrates a table of a various significance test according to one or more aspects of the disclosed subject matter.

FIG. 6B illustrates a table of various significance tests according to one or more aspects of the disclosed subject matter.

FIG. 6C illustrates a table of various significance tests according to one or more aspects of the disclosed subject matter.

FIG. 6D illustrates a table of a significance test according to one or more aspects of the disclosed subject matter.

The system 100 includes several advantages. For example, the system 100 can take the variables of a cyclist passing situation into account when operating autonomously. Because the system 100 can identify several important variables corresponding to various cyclist passing situations (e.g., bike lane vs. no bike lane, paved road shoulder vs. unpaved road shoulder, oncoming traffic vs. adjacent traffic flowing in the same direction, etc.), the autonomous vehicle 102 can safely and efficiently pass cyclists. As a result, cyclists and autonomous vehicles can safely share the road.

Another advantage is that the path planned by the autonomous vehicle 102 in light of the cyclist passing situation can be displayed so that an operator of the autonomous vehicle 102 can view the planned path of the autonomous vehicle 102. As a result, the operator of the autonomous vehicle 102 can be confident that the autonomous vehicle 102 has identified any cyclists and is reacting accordingly.

Additionally, the path planning can be based at least in part on real world data of drivers safely passing cyclists. For example, real world data can be used to determine a safe distance between the right side of the autonomous vehicle and the cyclist, when it is safe to encroach in the adjacent lane when passing the cyclist, and the like.

Another significant benefit is that the autonomous vehicle 102 uses real world/human behaviors to pass bicyclists, which will be understood by other humans sharing the road (e.g., when a human driver in opposite lane sees a bike and a car up ahead and understands that the car will probably shift into its lane to pass the bicyclist, which makes sense because he/she has seen humans do the same thing). In other words, the autonomous vehicle 102 can be configured to following a predetermined pattern of driving that human drivers can recognize, understand, and safely respond to.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A system, comprising:
an imaging device; and
processing circuitry configured to
receive information from the imaging device,
receive information from a positioning system,
identify variables to a left side and a right side of an autonomous vehicle based on the information received from the imaging device,
determine whether the identified variables identify a cyclist passing situation based on the information received from the imaging device, the cyclist passing situation being a situation in which the autonomous vehicle passes the cyclist,
in a case when the cyclist passing situation is not identified based on the information received from the imaging device alone, identify the cyclist passing situation based on the information from the imaging device and the positioning system,
match the cyclist passing situation with real world data collected from vehicles driven by human drivers in corresponding situations, the real world data including a least a safe passing distance relative to the cyclist as determined from data collected from the vehicles driven by the human drivers passing cyclists, and
plan a path of the autonomous vehicle based on the real world data,
wherein the cyclist passing situation is based on the information received from the imaging device includes identifying a centerline as either a solid center line or a dashed center line, and a current weather condition,
the cyclist passing situation being based on the information received from the imaging device includes identifying when the cyclist is traveling in a bike lane, the processing circuitry determining that the cyclist passing situation arises when the cyclist is not traveling in the bike lane, and
the cyclist passing situation and the path of the autonomous vehicle is planned taking into account whether the cyclist is traveling at less than half of a posted speed limit and whether passing is permitted in a no-passing zone when a vehicle travels at less than half of the posted speed limit,
wherein the planned path of the autonomous vehicle is displayed in the autonomous vehicle.

2. The system of claim 1, further comprising:
a positioning system, wherein the positioning system utilizes maps accessible by the processing circuitry.

3. The system of claim 1, wherein the cyclist passing situation being based on the information received from the imaging device includes identifying a type of road shoulder including paved or unpaved.

4. The system of claim 1, wherein the cyclist passing situation being based on the information received from the imaging device includes identifying oncoming traffic in an adjacent lane.

5. A method for passing a cyclist, comprising:
receiving, via processing circuitry, information from an imaging device;
receiving information from a positioning system;
identifying, via the processing circuitry, variables to a left side and a right side of an autonomous vehicle based on the information received from the imaging device;
determining whether the identified variables identify a cyclist passing situation based on the information received from the imaging device, the cyclist passing situation being a situation in which the autonomous vehicle passes the cyclist;
in a case when the cyclist passing situation is not identified based on the information received from the imaging device alone, identifying the cyclist passing situation based on the information from the imaging device and the positioning system;
matching, via the processing circuitry, the identified cyclist passing situation with real world data collected from vehicles driven by human drivers in corresponding situations, the real world data including a least a safe passing distance relative to the cyclist as determined from data collected from the vehicles driven by the human drivers passing cyclists; and
planning, via the processing circuitry, a path of the autonomous vehicle based on the real world data,
wherein the cyclist passing situation is based on the information received from the imaging device includes identifying a centerline as either a solid center line or a dashed center line, and a current weather condition,
the cyclist passing situation being based on the information received from the imaging device includes identifying when the cyclist is traveling in a bike lane, the cyclist passing situation being determined to arise when the cyclist is not traveling in the bike lane, and the cyclist passing situation and the path of the autonomous vehicle is planned taking into account whether the cyclist is traveling at less than half of a posted speed limit and whether passing is permitted in a no-passing zone when a vehicle travels at less than half of the posted speed limit, wherein the planned path of the autonomous vehicle is displayed in the autonomous vehicle.

6. The method of claim 5, wherein the cyclist passing situation being based on the information received from the imaging device includes identifying a type of road shoulder including paved or unpaved.

7. The method of claim 5, wherein the cyclist passing situation being based on the information received from the imaging device includes identifying oncoming traffic in an adjacent lane.

8. A non-transitory computer-readable storage medium storing computer-readable instructions that, when executed by a computer, cause the computer to perform a method, the method comprising:

receiving information from an imaging device;
receiving information from a positioning system;
identifying variables to a left side and a right side of an autonomous vehicle based on the information received from the imaging device;
determining whether the identified variables identify a cyclist passing situation based on the information received from the imaging device, the cyclist passing situation being a situation in which the autonomous vehicle passes the cyclist;
in a case when the cyclist passing situation is not identified based on the information received from the imaging device alone, identifying the cyclist passing situation based on the information from the imaging device and the positioning system;
matching the identified cyclist passing situation with real world data collected from vehicles driven by human drivers in corresponding situations, the real world data including a least a safe passing distance relative to the cyclist as determined from data collected from the vehicles driven by the human drivers passing cyclists; and
planning a path of the autonomous vehicle based on the real world data,
wherein the cyclist passing situation is based on the information received from the imaging device includes identifying a centerline as either a solid center line on a dashed center line, and a current weather condition,
the cyclist passing situation being based on the information received from the imaging device includes identifying when the cyclist is traveling in a bike lane, cyclist passing situation being determined to arise when the cyclist is not traveling in the bike lane, and
the cyclist passing situation and the path of the autonomous vehicle is planned taking into account whether the cyclist is traveling at less than half of a posted speed limit and whether passing is permitted in a no-passing zone when a vehicle travels at less than half of the posted speed limit,
wherein the planned path of the autonomous vehicle is displayed in the autonomous vehicle.

9. The non-transitory computer-readable storage medium of claim 8, wherein the cyclist passing situation being based on the information received from the imaging device includes identifying a type of road shoulder including paved or unpaved.

* * * * *